Figures 1, 2, 3, 4:
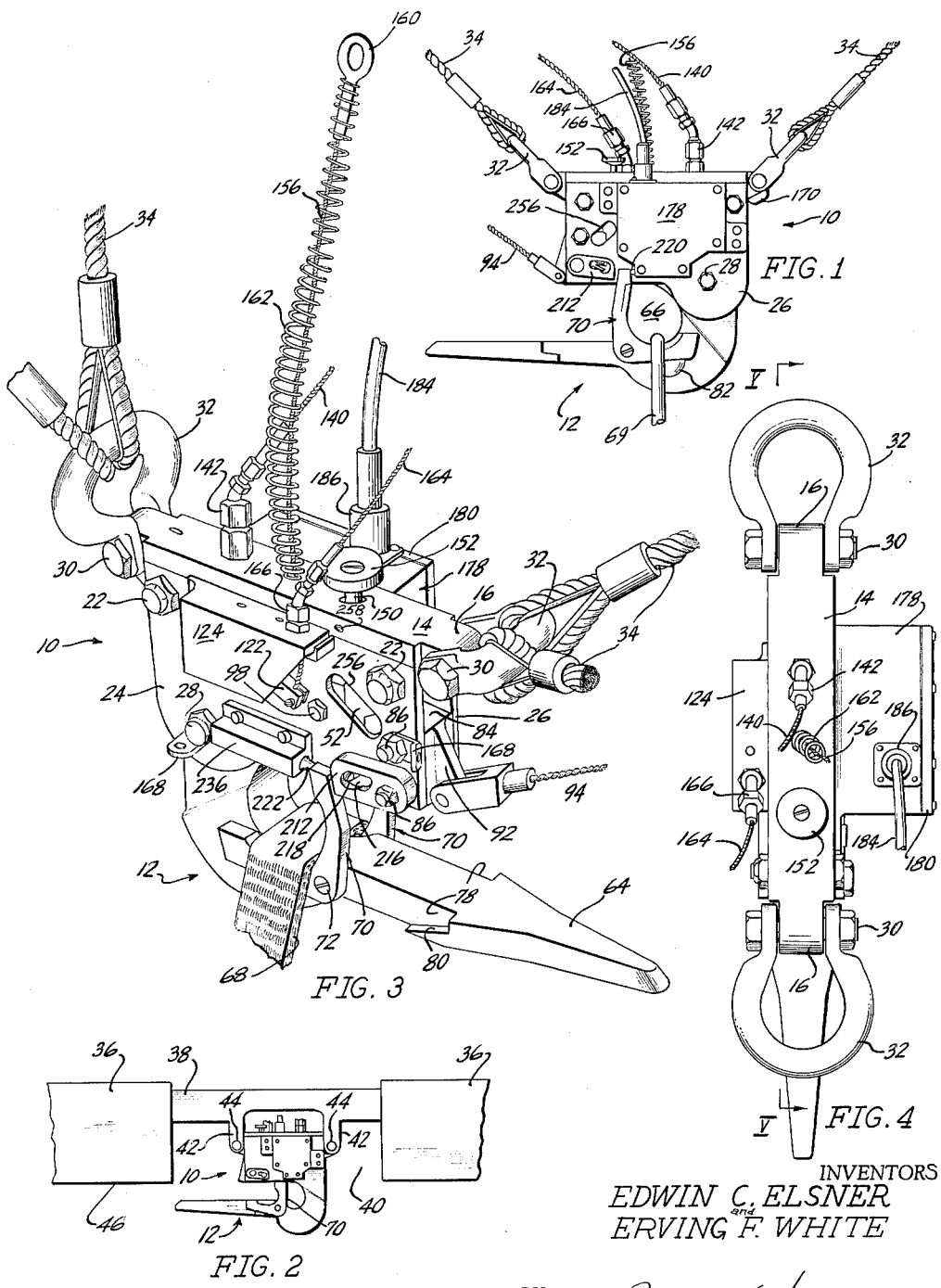

Dec. 21, 1965  E. C. ELSNER ETAL  3,224,803
CARGO HOOK

Filed May 20, 1963 4 Sheets-Sheet 1

INVENTORS
EDWIN C. ELSNER and
ERVING F. WHITE

BY Jerry K. Harmead
Their ATTORNEY

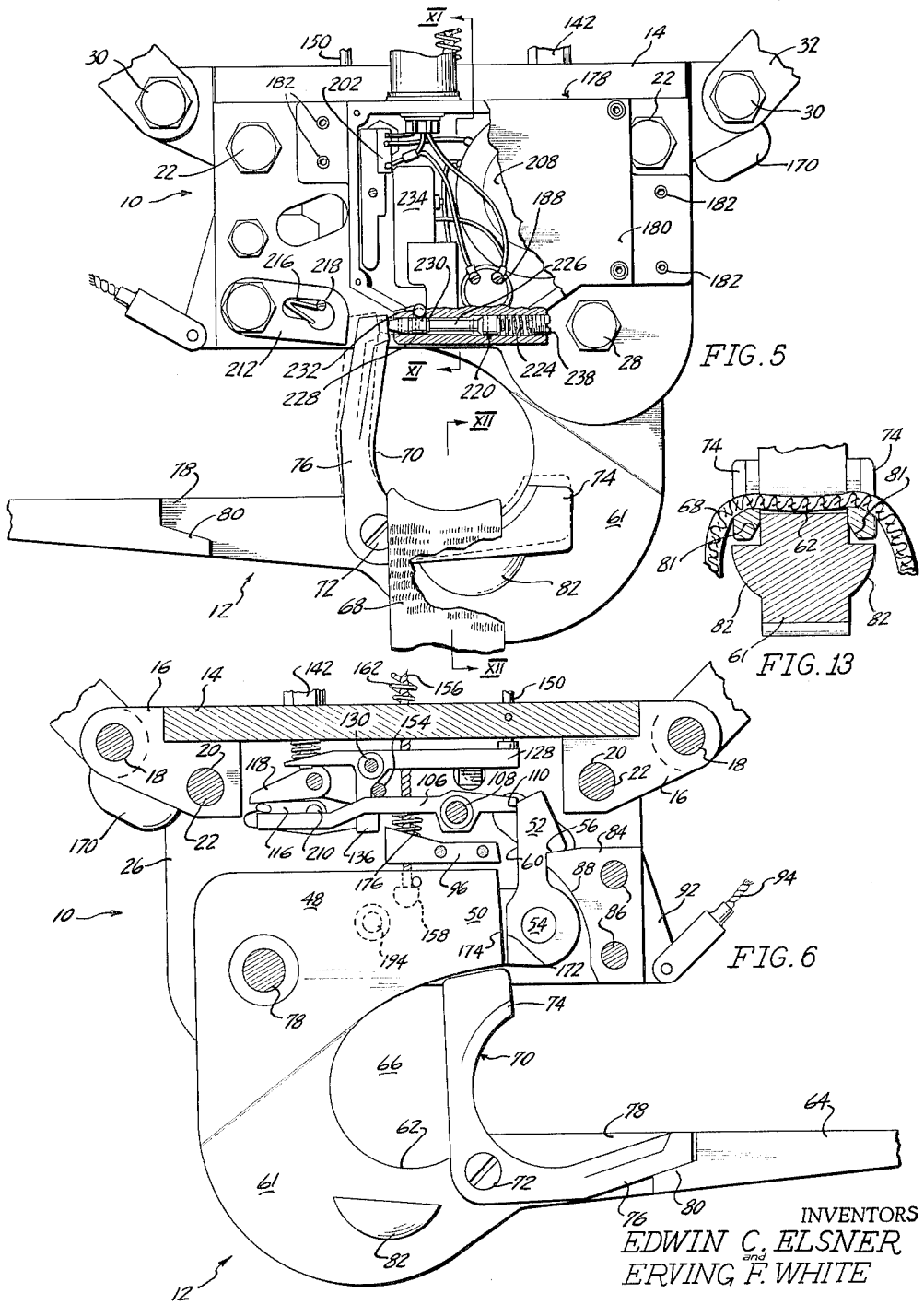

Dec. 21, 1965   E. C. ELSNER ETAL   3,224,803
CARGO HOOK

Filed May 20, 1963   4 Sheets-Sheet 3

INVENTORS
EDWIN C. ELSNER
and
ERVING F. WHITE
BY Jerry K. Harness
Their ATTORNEY

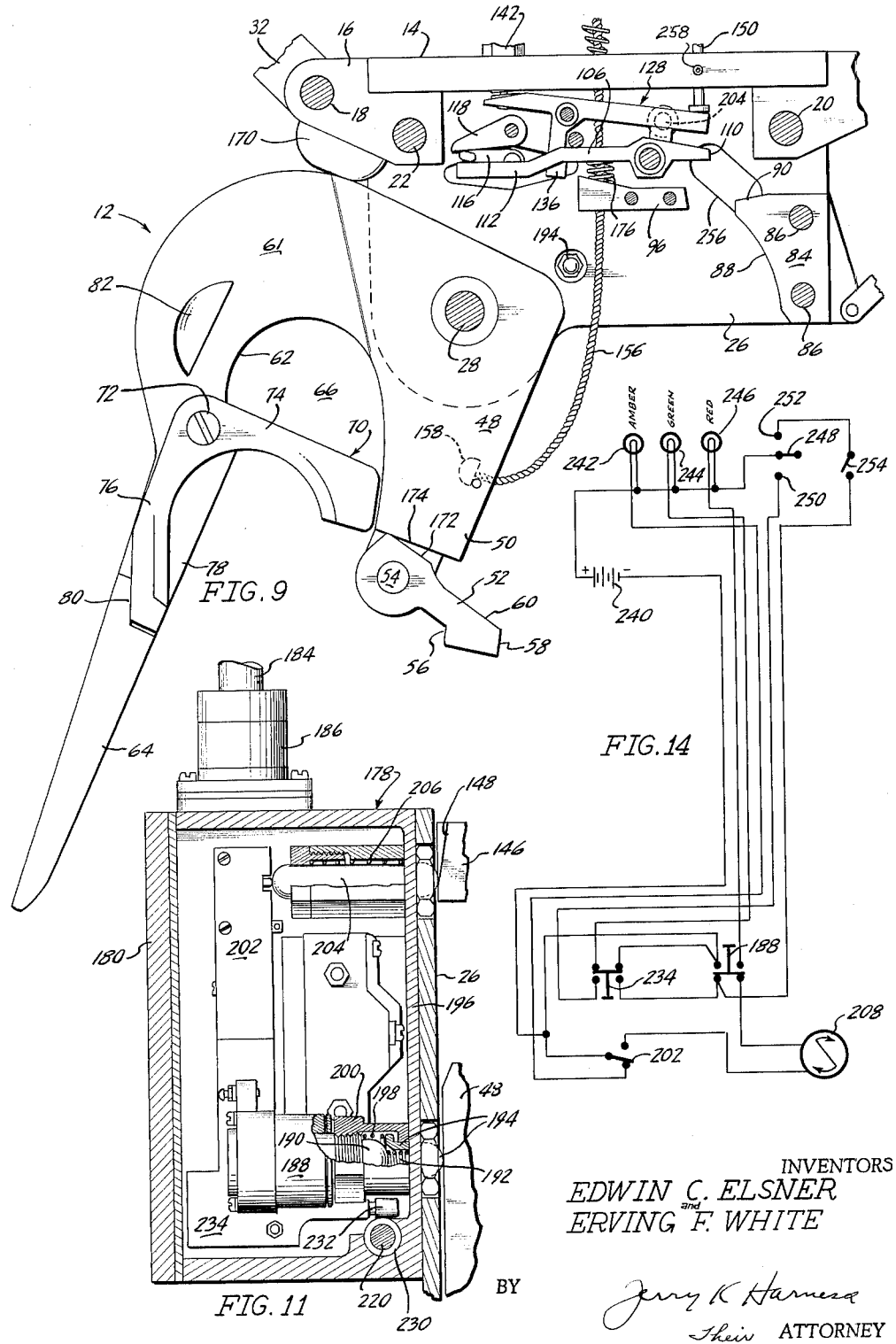

United States Patent Office 3,224,803
Patented Dec. 21, 1965

3,224,803
CARGO HOOK
Edwin C. Elsner, Glendale, Calif., and Erving F. White, Jackson, Mich., assignors to Aeroquip Corporation, Jackson, Mich.
Filed May 20, 1963, Ser. No. 281,491
10 Claims. (Cl. 294—83)

The invention pertains to a releasable hook apparatus of the type which may be used with aircraft and the like wherein the hook is capable of releasing its load when desired.

Releasable hook apparatus, such as the type commonly referred to as helicopter or aircraft cargo hooks, is required to operate and function in several diverse manners. Such hooks are commonly affixed to or suspended from aircraft wherein the cargo may be readily received within the hook and thereby transported by the aircraft. As such aircraft-transported cargo is often utilized under very adverse conditions, such as during battle, it is necessary that the operation of the hook be highly dependable and efficient. Also, as aircraft-supported cargo is often transported over populated areas and as the cargo is often of considerable value, safety features are highly important, and it is also important that the aircraft pilot be aware of the operational status of the hook at all times, and be informed when the hook is ready to receive or has released its load.

Therefore, it is an object of the invention to provide releasable hook apparatus wherein a throated hook is pivotably mounted on the support body and employs such latch and release means as to be highly dependable and safe.

Another object of the invention is to provide releasable hook apparatus employing a throated hook and a load retainer wherein reception of the load within the hook automatically renders the load retainer operative, and the load retainer cannot be disengaged until the hook is released.

Yet another object of the invention is to provide a releasable hook apparatus having a hook pivotal between latched and unlatched positions wherein sensing and indicating means are employed to indicate to a remotely located operator whether the hook is in the latched or unlatched position.

A further object of the invention is to provide releasable hook apparatus wherein safety means are employed in conjunction with the hook-releasing structure and disengagement of the safety means is necessary to permit release of the hook.

Another object of the invention is to provide a releasable hook apparatus employing a safety lock in conjunction with hook-releasing mechanism wherein sensing and indicating means are provided to indicate the position of the safety means.

A further object of the invention is to provide a releasable hook apparatus having a throated hook wherein load-sensing means are associated with the hook, sensing the load imposed thereon whereby automatic releasing may be selectively produced upon the load being placed on a support.

A further object of the invention is to provide an electrically operated, releasable hook apparatus wherein the electrical components are mounted within a water tight housing, and wherein the hook components are self-cleaning, and are so constructed as to remain functional under adverse climate and environmental conditions.

Yet another object of the invention is to provide releasable hook apparatus of the electric, solenoid-operated type wherein a manually-operated safety lock is employed, and the release structure may be manually operated at a location remote from the hook, as well as electrically operated.

Another object of the invention is to provide releasable hook apparatus which may be remotely controlled both manually and electrically, and may be manually operated directly at the hook.

Another object of the invention is to provide releasable hook apparatus of such construction as to be relatively foolproof in operation.

A further object of the invention is to provide releasable hook apparatus having a throated hook and load-retainer means wherein the load retainer conforms to the configuration of the hook prior to placing the load thereon, and the load retainer does not interfere with the release of the load from the hook when the hook is released.

Another object of the invention is to provide releasable hook apparatus employing a throated hook wherein the hook is pivotable between latched and unlatched positions, and hook-relatching apparatus is provided which may be remotely operated.

An additional object of the invention is to provide a releasable hook apparatus which may be electrically released and wherein releasing of the hook automatically de-energizes the electrical release means.

Another object of the invention is to provide a releasable hook apparatus which is capable of withstanding extreme temperatures, high torques, and vibration.

Yet another object of the invention is to provide an aircraft releasable hook apparatus wherein the release of the hook may be accomplished by the flight crew electrically or manually, or automatically upon engagement of the load with a support, or manually from the ground.

Figure 10:
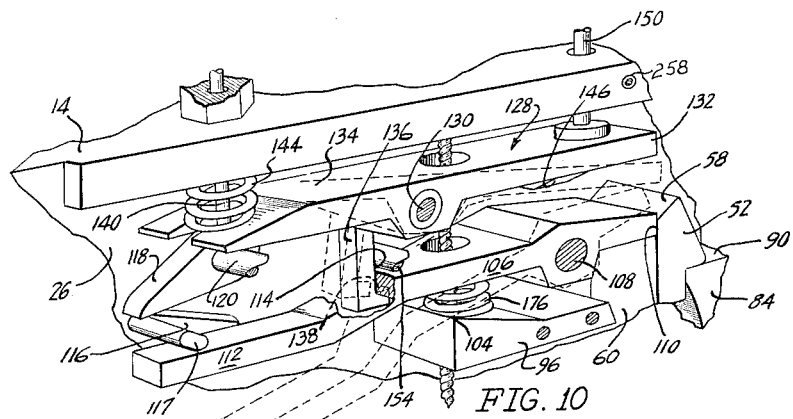
Figure 8:
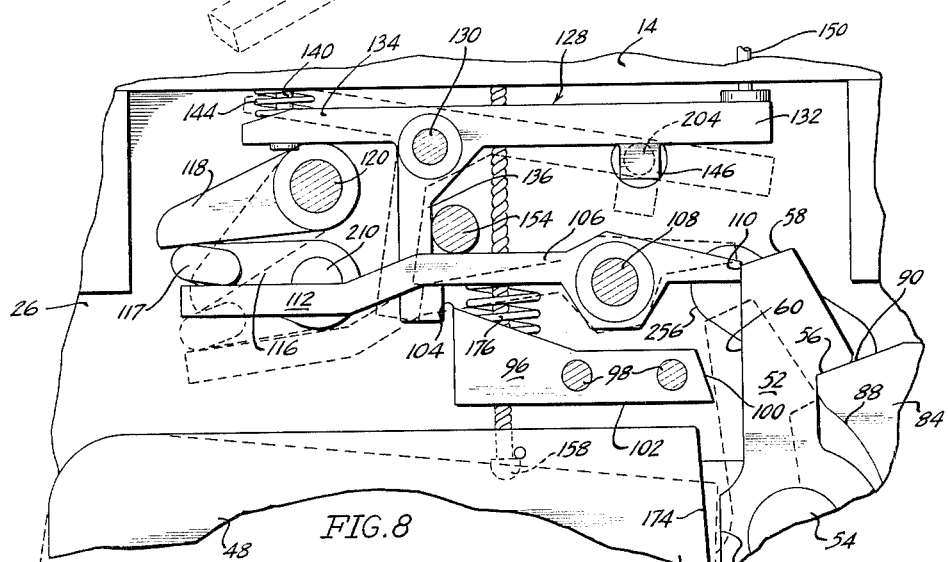
Figures 7, 12:
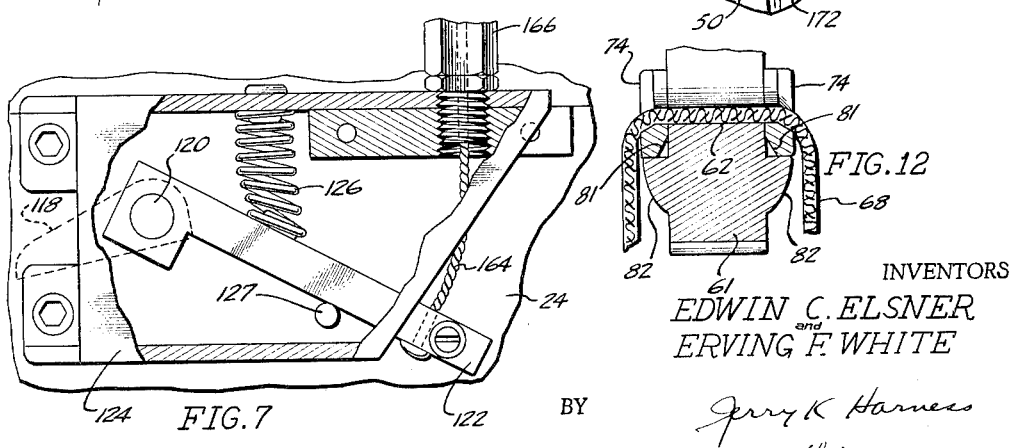

These and other objects of the invention will be apparent from the relationships and details of the components of an embodiment thereof, as set forth in the following description and accompanying drawings wherein:

FIG. 1 is an elevational view of one side of a hook, in accord with the invention, as supported on flexible cables, FIG. 2 is an elevational, diagrammatic view of another installation of the hook of the invention, wherein the hook is rigidly affixed to the supporting structure, FIG. 3 is a perspective, side and front view of the hook, in accord with the invention, showing a load received thereon, FIG. 4 is a plan view of the hook of FIG. 3 with the flexible cables removed, FIG. 5 is an enlarged, elevational view of the left side of the hook when carrying a load wherein a portion of the electrical component housing has been cut away, and the load retainer is illustrated in the "under load" position in full lines and in the automatic releasing position in the dotted lines, FIG. 6 is an elevational view of the interior of the support body of the hook apparatus with a side plate removed, as taken along section V—V of FIG. 4, and illustrating the load retainer in the load-receivable position, FIG. 7 is an enlarged, detail, partially sectioned, elevational view of the manual release mechanism, FIG. 8 is an enlarged, elevational, sectional detail view of the hook, latch, and releasing mechanism, illustrating the latched position in full lines and the released position in dotted lines, FIG. 9 is an elevational view similar to FIG. 5, however, illustrating the unlatched position of the hook and after the load has been released therefrom, FIG. 10 is an enlarged, detail, perspective view of the latch pawl and safety lock lever illustrated in the operaative position in full lines and the release position in dotted lines, FIG. 11 is an elevational, sectional view of the electrical component housing, as taken along section XI—XI of FIG. 5, FIG. 12 is an elevational, sectional view of the hook and load retainer illustrated in the load-carrying relationship, as taken along section XII—XII of FIG. 5, FIG. 13 is an elevational, sectional view similar to FIG. 12, illustrating the relationship of the load retainer and hook shown in the dotted lines of FIG. 5 at "touch down" of the load and prior to release of the hook, and FIG. 14 illustrates the circuit diagram as employed with the hook apparatus.

The releasable hook apparatus embodiment illustrated in the drawings basically includes a support body 10 having a hook or load-bearing arm 12 pivotally mounted thereto. The support body is adapted to be supported by the hook apparatus-supporting structure, and the hook may be supported on flexible cable devices, as shown in FIGS. 1 and 3, or may be rigidly affixed to a support beam as will be described with regard to FIG. 2.

The support body 10 includes at its upper regions a support beam 14 provided at each end with a boss 16, each boss having a hole 18 defined therein adapted to receive a supporting bolt and a hole 20 receiving a bolt 22 whereby a pair of parallel side plates 24 and 26 may be affixed to and depend downwardly from the support beam. The hook 12 is pivotally mounted between the side plates 24 and 26 on shaft 28 which is supported at its ends on the side plates. As will be described, suitable latching and hook actuation means are mounted on the support body 10 between the side plates to control the operation of the hook.

If the hook apparatus is to be suspended below an aircraft on flexible cables, the bolt 30 of a clevis 32 is inserted through each of the holes 18 whereby a pair of cables 34 may be affixed to each clevis. The cables 34 are suspended from the aircraft. If it is desired to mount the hook apparatus rigidly to the aircraft or other supporting structure, an arrangement such as shown in FIG. 2 may be employed. In FIG. 2, numeral 36 represents the floor of an aircraft, or other supporting structure, having a beam 38 affixed to the supporting structure and extending across an opening 40 defined therein. The beam 38 includes a pair of downwardly depending ears 42 to which the hook apparatus may be affixed by means of bolts 44 extending through the holes 18. It will be noted that with this type of mounting of the hook apparatus in aircraft, the throat of the hook 12 is located below the lower surface 46 of the aircraft.

The configuration of the hook or load arm 12 will be best appreciated from FIGS. 3, 6, and 9. The hook includes an upper portion 48 having a hole defined therein in which the shaft 28 is received. The upper hook portion 48 also includes a rather massive latch-supporting extension 50 having a latch 52 pivotaly affixed to the end thereof by a pivot pin 54. The configuration of the latch 52 is shown in detail in FIGS. 8 and 9 and includes a latch plate-engaging surface 56, a guide surface 58, and a retainer pawl-engaging surface 60.

The lower portion 61 of the hook includes a concave, load-bearing surface 62, and an elongated projection 64. It will be appreciated that the upper and lower portions 48 and 61 define a hook throat 66 into which a load member, such as the web loop portion 68 or load ring 69, FIG. 1, may be received.

A pair of L-shaped load-retainer elements 70 are pivotally mounted on the lower hook portion 61 by a pivot shaft, not shown, passing through the hook. The load-retainer elements 70 are affixed to the pivot shaft by screws 72 whereby the load retainers on each side of the hook portion 61 pivot as a unit. The load-retainer elements each include a load-engaging arm 74 and a retainer arm 76. Coil spring means are preferably associated with the pivot shaft supporting the retainer elements 70 whereby the elements are rotatably biased toward the load-receivable position illustrated in FIGS. 2 and 6.

As apparent in FIG. 3, the projection 64 is recessed at 78 on each side and provided with a ledge 80 adapted to receive and position the adjacent retainer arm 76 when the load-retainer elements are in the load-receivable position. With the load-retainer elements in the load-receivable position shown in FIGS. 2 and 6, the arms 76 are of such dimension as to produce a smooth blending with the sides of projection 64, and thereby not interfere with the reception or release of the load members 68 or 69 on the hook. The load-engaging arms 74 are provided with a concave configuration substantially conforming to the configuration of the load-bearing surface 62 and dirt wiping and clearance-inclined surfaces 81, and stop lugs 82 are defined on the hook portion 61 to engage the underside of the arms 74 to prevent excessive rotation thereof beyond the position shown in FIGS. 3, 5, and 12, wherein a load is being applied to the hook and the retainer arms 76 are in a vertical relationship which prevents removal of the load loop from the hook throat.

A latch plate 84 is rigidly affixed between the side plates 24 and 26 by means of bolts 86. The latch plate 84 has a guide surface 88 defined thereon and a latch-engaging surface 90. The latch plate 84 also includes a forwardly extending rib 92 having a hole defined thereon for receiving a guide line 94, FIG. 3, if it is desired to employ a guide line between the hook and the aircraft to facilitate entry of the load loop into the hook during attachment of the load to the aircraft.

A stop member 96 is also rigidly affixed to the support body between the side plates 24 and 26 by means of bolts 98, and includes a lower hook-engaging stop surface 102, a latch stop surface 100 which limits upward hook movement during relatching, and a pawl abutment edge 104.

In addition to the latch plate 84, the latch-locking means includes a latch retainer or locking pawl 106 pivotally mounted intermediate the side plates 24 and 26 on a pivot pin 108. The pawl 106 includes an abutment end 110 adapted to selectively engage the surface 60 of the latch and an actuating end 112, whereby the pawl may be rotated between operative and inoperative positions by a solenoid or manual release means. As will be apparent from FIG. 10, the pawl 106 is substantially of the width separating the side plates 24 and 26, and includes a recessed portion 114 adapted to receive a locking abutment of a safety lock lever, as will be later described.

A solenoid-operated cam arm 116 has a radial, elongated projection 117 which engages the upper side of the pawl end 112, and a manual release cam arm 118 engages the upper portion of the projection 117. The manual release arm 118 is pivotally mounted between the side plates on a pivot pin 120 which extends through the side plate 24 having a manual release arm 122, FIG. 7, affixed thereto on the exterior of the side plate 24. A cover 124 is affixed to the side plate 24 shielding the release arm 122 whereby only the outer end of the release arm is exteriorly accessible. A spring 126 is interposed between the upper portion of the cover 124 and the release arm 122 biasing the release arm in the downward position toward stop pin 127 which tends to rotate the manual cam release arm 118 in the clockwise direction, as appearing in FIG. 8.

The safety lock lever 128 is pivotally mounted between the side plates 24 and 26 on a pivot pin 130, and is somewhat of a T-configuration, including a manual release portion 132, a remote release portion 134, and a downwardly extending abutment portion 136. The abutment portion 136 is provided with an upwardly facing shoulder 138, FIG. 10, which is adapted to be positioned under the pawl 106 to prevent rotation of the pawl in the direction which would unlock the latch and latch plate. A flexible cable 140 is affixed to the end 134 of the safety lock lever 128, and extends through a fitting 142, FIG. 3, whereby the cable may extend into the aircraft for actuation by a crew member. A compression spring 144 is interposed about the cable 140 between the safety lock lever end 134 and the support beam 14, biasing the lock lever toward the operative position. The safety lock lever portion 132 includes a downwardly extending boss 146 having an inclined surface 148, FIG. 11, defined thereon adjacent the support plate 26. The surface 148 cooperates with electrical sensing means, as will be described later.

Manual operation of the safety lock lever 128 may be accomplished through actuation of an axially, slidable plunger 150 mounted within the support beam 14. The plunger 150 is provided with a cap 152 at its upper end, having a concave surface defined therein, whereby the plunger may be manually actuated by a stick or rod from the aircraft should the cable 140 break.

A fixed abutment bolt 154 extends through the side plates 24 and 26 and is so located as to prevent excessive clockwise rotation of the pawl 106.

To permit relatching of the hook from the aircraft, a flexible cable 156 extends through the support body 10 and is affixed to the upper portion 48 of the hook at the cable end 158, FIG. 9. As will be apparent, suitable holes are provided in the support beam 14, safety lock lever 128, locking pawl 106, and stop 96, to permit connection of the cable to the hook. The upper end of the cable 156 is provided with an eye 160 to which cable means from the aircraft may be affixed. To prevent kinking of the cable 156 within the support body 10 and eliminate the possibility of the cable interfering with relatching operations wherein the hook is directly manually pivoted to the relatched position, a coil compression spring 162 is interposed between the support beam 14 and the eye 160 to maintain a predetermined tension on the cable. The tension produced by the spring 162 is not of such force as to interfere with the hook-releasing operation.

Manual actuation of the release arm 122 from the aircraft is produced through a cable 164 extending through the cover-mounted fitting 166, and affixed at its lower end to the end of the arm. Thus, the arm 122 may be rotated in the counterclockwise direction, FIG. 7, by means of the cable 164, or the operator may rotate arm 122 by merely pushing the end of the arm toward the fitting 166.

A pair of clips 168 may be affixed to the hook apparatus by convenient attaching means, such as the nuts associated with shaft 28 and bolt 86, FIG. 3. Stowage cables, not shown, are attached to the clips 168 whereby, when the hook is suspended from an aircraft by flexible cables, the hook may be withdrawn into the aircraft.

The relationship of the latch and the latch-locking means, when the hook is in the latched position, is shown in FIGS. 5, 6, 7, 8, and 10 in full lines. In the latched position the surface 56 of the latch 52 will be in engagement with the surface 90 of the latch plate 84. Engagement of these surfaces is maintained by the pawl 106 which prevents movement of the latch to the left, FIG. 8, which would, of course, disengage the latch surface 56 from the latch plate surface 90. Pivoting of the pawl 106 in the counterclockwise direction, FIG. 8, by means of either actuating the solenoid cam arm 116 in a downward direction or by pivoting the cam arm 116 downwardly by rotation of the manual release cam arm 118, will lift the pawl end 110 from engagement with the latch surface 60, and the load imposed on the hook will cause the latch to disengage from the latch plate. It will be noted that the surfaces 56 and 90 are inclined with respect to the vertical force which will be imposed on the latch 52 by a load mounted on the hook. By inclining these surfaces, the disengagement of the pawl 106 from the latch 52 will insure release of the latch from the latch plate. Upon rotation of the pawl 106 to the dotted line position of FIGS. 8 and 10, the latch 52 rotates counterclockwise, under load forces, into engagement with the surface 100 of the stop 96. The clearance between the stop 96 and the latch plate 84 is sufficient to permit the latch to pass therethrough, and the hook will swing open to the position of FIG. 9. To absorb the forces imposed on the hook as it is released, a resilient bumper 170 is affixed to the support beam 14 and engages the hook as it is swung open after release of the load.

To relatch the hook 12 it is merely necessary to rotate the hook in the counterclockwise direction, FIG. 9, either by directly grasping the hook or pulling on the cable 156. Pivoting of the hook in the counterclockwise direction from the position shown in FIG. 9 causes the latch 52 to engage the latch plate guide surface 88 and be guided upwardly between the stop 96 and the latch plate 84. It will be noted that latch flats 172 engage hook surfaces 174 to prevent excessive pivoting of latch 52 on pin 54 when the hook is unlatched. As the counterclockwise movement of the hook continues, the surface 58 of the latch will engage the underside of the end 110 of pawl 106 and the inclination of the surface 58 will tend to bias the latch in the clockwise direction, FIG. 8, and also pivot the pawl 106 in the counterclockwise direction against the biasing action of the spring 176 interposed between the pawl 106 and the stop 96. While the upward movement of the latch 52 tends to pivot the pawl in the counterclockwise direction, such rotation of the pawl is limited by engagement with the edge 104 of the stop 96. Further upward movement of the hook and latch causes the latch to be moved to the right, FIG. 8, and permits the pawl end 110 to engage the latch surface 60. This relationship insures alignment of the latch surface 56 and the latch plate surface 90, wherein clockwise rotation of the hook is once again restricted by the engagement of surfaces 56 and 90.

It will be appreciated from FIGS. 8 and 10 that counterclockwise rotation of the pawl 106 will be prevented when the shoulder 138 of the safety lock lever portion 136 is located below the pawl, as shown in the full line positions of these figures. Accordingly, it is necessary that the safety lock lever 128 be rotated to the inoperative position to swing the shoulder 138 out of the path of movement of the pawl 106 before the pawl may be pivoted in the counterclockwise direction to release the latch 52 from the latch plate 84.

The electrical components directly mounted on the support body 10 are all located within a rectangular box-like housing 178 having a removable cover 180, FIGS. 5 and 11. The housing 178 is affixed to the side plate 26 by screws 182 and by means of an electric cable 184 and socket 186, electric connections between the components with the housing and the aircraft are produced.

The electrical components within the housing 178 include a microswitch 188 operated by an axially movable plunger 190, FIG. 11. The plunger 190 is actuated by means of a coil spring 192 located within a button 194 extending through the inner housing wall 196 and the side plate 26. Sealing means, not shown, seal the button 194 with respect to the housing wall 196, and a larger spring 198 interposed between the button and the microswitch structure biases the button to the right, as shown in FIG. 11. A retaining cap 200 mounted on the switch 188 forms a part of the assembly of the switch and button. Upon the button 194 being sufficiently depressed to the left, the force imposed on the plunger 190 by the spring 192 is sufficient to actuate the switch 188. The button 194 extends through the side plate 26 sufficiently to be engaged and depressed by the hook upper portion 48 when the hook is in the latched position. In this manner, the switch 188 senses the latched and unlatched hook positions.

A second microswitch 202 is mounted within the housing 178 and is actuated by a plunger 204 mounted within the housing and extending through the housing wall 196 and through the side plate 26. The plunger 204 is also sealingly associated with the housing wall 196 and is biased to the right, FIG. 11, by a spring 206. The plunger 204 extends into the path of movement of the safety lock lever boss 146, and is adapted to engage the inclined surface 148 and be axially positioned thereby to actuate the switch 202. The switch 202 therefore senses the position of the safety lock lever 128 and is actuated according to whether the safety lock lever is in the operative or inoperative position.

The solenoid 208 which operates the solenoid cam arm 116 is also located within the housing 178 and is preferably of the rotary solenoid type such as that manufactured by the Ledex Corporation, of Dayton, Ohio, designated size 7S. The operating shaft 210 of the solenoid, on which arm 116 is mounted, extends through the inner wall of the housing and the side plate 26, and is sealed thereto to maintain the water tightness of the housing.

To insure retention of the load on the hook load-supporting surface 62, a pair of pivotal keeper stop links 212 are mounted on the support body 10, a link 212 being pivotally mounted on the exterior of each of the support plates 24 and 26. The links 212 are each pivotally mounted on the ends of the lower bolt 86 and are recessed to receive a leaf spring 216 anchored to a pin 218 affixed to the associated side plate, whereby the free ends of the link will be biased downwardly in a direction toward the hook surface 62.

When the load-retainer elements 70 pivot from the load-receivable position illustrated in FIG. 6 to the position illustrated in FIGS. 3 and 5, due to the load loop engaging the arms 74, the ends of the arms 76 engage the free ends of the links 212 and pivot the links upwardly whereby the arms 76 may pass thereunder and be positioned as shown in FIGS. 3 and 5.

A pair of spring-biased plungers 220 and 222 are mounted on the support body 10 for engaging the arms 76 while a load is being supported on the hook. As shown in FIG. 5, a plunger 220 is axially, slidably mounted within the lower portion of the housing 178 and is biased toward the associated arm 76 by a double spring arrangement 224. The outer end of the plunger 220 is in direct engagement with the end of the arm 76. The plunger 220 is provided with a reduced portion 226 and an enlarged portion 228 defining a shoulder 230. A roller 232 engages the plunger adjacent the shoulder 230 whereby axial movement of the plunger 220 is sensed by the roller. The roller forms a part of the microswitch 234 located within the housing 178, whereby radial movement of the roller as it engages either portion 226 or 228, due to changes in the axial position of the plunger 220, actuates switch 234.

A similar spring-biased plunger 222 is mounted on the side plate 24 within a housing 236 as is biased toward the associated arm 76 by a spring arangement similar to that shown in FIG. 5. However, no roller or switch devices are associated with plunger 222.

When a load is being supported on the hook load-bearing surface 62 by means of a load loop 68, for instance, the loop will also be engaging the arms 74 and force the retainer in a clockwise direction, FIG. 5. Pivoting of the retainer elements 70 in this direction is limited by the stop lugs 82. The pivoting of the retainer elements 70, due to the load, biases the arms 76 into engagement with the plungers 220 and 222, compressing the springs 224 and causing the plungers to be retracted into their respective housings. Such action is sensed by the roller 232 in that when a load is being imposed on the hook, the roller will be engaging the maximum diameter portion 228 of the plunger. It will be appreciated, also, that once the load-retainer elements 70 have pivoted to the load-retaining position of FIGS. 3 and 5, the links 212 will prevent the retainer elements from returning to the position shown in FIGS. 2 and 6 as long as the hook remains latched.

By adjustment of screws 238, FIG. 5, the spring force imposed on the load-retainer elements 70, tending to rotate the load-retainer elements in a counterclockwise direction, may be varied. Thus, should the force being imposed on the load-retainer arms 74 by the load loop 68 become less than the force being imposed on the retainer arms 76 by springs 224, the load-retainer arms 76 will pivot into engagement with the links 212, as shown in the dotted lines of FIG. 5. Such occurrence will cause the switch roller 232 to pass over the plunger shoulder 230 and engage the minimum diameter portion 226, thereby actuating switch 234.

Upon the latch-locking means actuating to release the latch 52 from the latch plate 84, the hook 12 will pivot to the position shown in FIG. 9. Pivoting of the hook to this position drops the load-retainer arms 76 from engagement with the links 212 and, thus, permits the retainer elements 70 to automatically return to the load-receiving position shown in FIGS. 6 and 9, due to the biasing force imposed on the load-retainer elements by the spring within the shaft associated with screws 72. Additionally, it will be appreciated that unlatching of the hook when a load is imposed thereon very quickly and forceably pivots the hook to the unlatched position due to the weight of the load, and that the load loop would engage and open the retainer elements even if biasing means were not employed therewith.

FIG. 14 illustrates the circuit diagram as employed with the hook apparatus wherein the electrical supply source of the aircraft is indicated at 240. An amber light 242, a green light 244, and a red light 246, are located within the aircraft cockpit so as to be observed by the crew members. A selective switch 248 is also located within the cockpit, having a neutral or "safe" position as illustrated. Terminal 250 represents the automatic touch-down switch position, and terminal 252 represents the pilot control position. A switch 254 is located within the pilot control circuit, and is usually located on an aircraft flight control so as to be readily accessible to the pilot. The illustrated position of the switches is that which occurs when a load is being carried by the hook and the safety lock lever is in the operative position.

The operation of the hook apparatus in accord with the invention will now be described.

Assuming the hook to be in a position ready to receive a load, the hook would be latched as shown in FIGS. 2, 6, 8, and 10, and the safety lock lever 128 may or may not be in the operative position, as this matter is at the option of the operator. The load-retainer elements 70 will be pivoted to the position shown in FIG. 6 under the influence of the spring associated with the shaft to which the screws 72 are affixed. Assuming the safety lock lever 128 to be pivoted to the operative position shown in the full lines of FIGS. 8 and 10, the circuit to only the amber light 242 would be energized, indicating that the plunger 204 was being depressed by the safety lock lever inclined surface 148, and that the safety lock lever was in its operative position. The circuits to lights 244 and 246 would be open, and the solenoid 208 is de-energized.

The hook apparatus is then "flown into" the load loop 68 or the load loop is merely placed on the hook by a crew member standing on the ground. As the load loop 68 is introduced into the throat 66 of the hook, the loop will engage the arms 74, and upon the loop being fully positioned in the throat, the load retainer arms 76 will have lifted the links 212, and will have assumed the position shown in dotted lines in FIG. 5. Upon the aircraft lifting the load from the ground, the force imposed by the load loop 68 on the arms 74 will pivot the retainer arms 76 from the position shown in the dotted lines of FIGS. 5 and 13, to the position shown in full lines of FIGS. 5 and 12, in that the force imposed on the retainer arms 74 by the load is greater than the biasing force imposed on the retainer arms 76 by the springs 224. Upon the load being carried by the hook 12, the switch 234 will be actuated by the resultant axial movement of the plunger 220, closing the circuit to the green light 244. The load is now air-borne, and the circuit components will be as shown in FIG. 14.

If the pilot desires to automatically release the hook upon the load engaging the ground whereby an automatic "touch-down" release is to be accomplished, the pilot will position the switch 248, establishing connection between the switch and terminal 250. Immediately prior to the landing of the cargo the pilot will tension the cable 140 to pivot the safety lock lever 128 to the dotted line positions of FIGS. 8 and 10. This action will actuate the switch 202 and the amber light 242 will go off. Only the green light is now on. When the load is supported on the ground, the biasing action imposed on the retainer arms 76 by the springs 224 will pivot the retainer elements 70 to the dotted line position of FIG. 5 and the position of FIG. 13, thereby actuating switch 234, due to the resultant axial movement of plunger 220. Such actuation of switch 234 closes the circuit to the solenoid 208 through switch 188. Energization of the solenoid 208 pivots the solenoid cam arm 116 downwardly, releasing the pawl 106 from the latch 52, permitting the hook to become unlatched. The hook 12 then swings to the open position shown in FIG. 9, releasing the load. Upon the hook 12 opening, the button 194 will sense the unlatched hook position and actuate switch 188 to energize red light 246 and break the circuit to the solenoid 208. Thus, the switch 188 prevents damage to the solenoid, as the solenoid is de-energized as soon as the hook has opened.

After the load has been released, the hook may be relatched by an operator on the ground or by pulling on the cable 156 from the aircraft. Of course, as soon as the load has been released, the pilot should return the switch 248 to the "safe" or neutral position illustrated.

If, when the load is air-borne, the pilot desires to manually, electrically control the hook-releasing operation, the switch 248 is placed in the position energizing terminal 252. The pilot will pivot the safety lock lever to the inoperative position if the lever has been previously in the operative position, and the solenoid 208 will be energized upon the switch 254 being closed. Again, it will be noted that upon the unlatching of the hook 12, the switch 188 will actuate and de-energize the solenoid circuit.

Should extreme safety precautions be desired in the releasing of the hook, the pilot may place the switch in the automatic "touchdown" position by closing terminal 250, and maintaining the safety lock lever 128 in the operative position. Thus, upon the load being deposited on a supporting surface, the switch 234 will actuate. However, the solenoid 208 will not be energized in that the solenoid circuit through switch 202 is open. The pilot may then release the hook by pivoting the safety lock lever to the inoperative position by tensioning cable 140 when he is sure that the load is on the ground. This sequence of operation is not normally employed, but may be used when a high degree of safety is desired, such as when the cargo includes humans.

In addition to the previously described sequences of operation, the load may be released manually from the ground by a ground crew member pivoting the manual release arm 122 upwardly. If the safety lock lever is in the operative position, the manual release of the hook by means of the arm 122 cannot be accomplished until the plunger 150 is manually depressed to pivot the safety lock lever to the inoperative position. Additionally, should the electrical system fail, the load may be manually released from the aircraft by tensioning the cable 164, and thereby manually pivoting the arm 122.

The condition of the hook 12 will always be apparent to the pilot in that the red light 246 will indicate the latched and unlatched positions of the hook. The green light 244 will indicate the condition of the automatic release switch 234, and the presence of a load on the hook, and the amber light 242 indicates the operative and inoperative positions of the safety lock lever 128. Although the pilot may not always desire to employ the safety lock lever 128, the position of the lock will be indicated.

It will be observed that when the hook is unlatched, as in FIG. 9, it cannot be latched unless the safety lock lever 128 is in the inoperative position. If the lock lever 128 is pivoted to the operative position while the hook 12 is unlatched, the latch 52 cannot be positioned on the latch plate 84, as the pawl 106 will not pivot to permit upward movement of the latch during relatching. This feature insures a quick emergency release of the hook after loading, if necessary, and the hook cannot be relatched and the safety lock lever placed in the operative position without the attention of a crew member.

To aid in the inspection of the hook, openings 256 are defined in the side plates 24 and 26, whereby the engagement of the surfaces 56 and 90, and the end 110 of the pawl 106, may be observed for any wear or damage which may have occurred at these important locations. As the structure located within the side plates is relatively open, accumulation of water, sand, dirt, and the like is prevented, and the wiping relationship between the surfaces 56 and 90, and the pawl end 110 and surface 60, tends to form a self-cleaning action maintaining these surfaces relatively free of foreign matter. Additionally, the use of inclined surfaces 81 on arms 74 prevents dirt or other foreign matter, which might accumulate on lugs 82, from interferring with the operation of arms 74 and lugs 82. The electrical components are all located within the watertight housing 178 and, thus, are not subject to adverse weather conditions. As the hook may be released either electrically or manually from the aircraft, and may be manually actuated from the ground, a versatility of operation is provided which is important with this type of apparatus wherein safety and operational assurance is vital.

It is often desired to "lock out" the safety lock lever 128 in the inoperative position when the hook apparatus is used in short hauls in nonpopulated areas, or for other reasons, and in such event the setscrew 258 is tightened against plunger 150 after the plunger is depressed to pivot lever 128 to the inoperative position. Screw 258 is threaded into a hole in beam 14 which intersects the hole-receiving plunger 150 and is therefore capable of holding the plunger in the depressed position.

The projection 117 is of a radial, elongated configuration to decrease the effective torque arm length of arm 116 on lever 106 when the hook is latched and thereby provide a maximum force on the pawl in the releasing direction during the initial stage of unlatching. This effect is due to the fact that the projection 117 is engaging the pawl 106 at a location near the solenoid shaft 210 when the pawl is latched, see the full lines of FIG. 8. When the pawl 106 is pivoted to the release position, note the dotted line position of FIG. 8, the projection 117 is engaging the pawl 106 at the end remote from shaft 210 to produce maximum pawl angular movement for a given rotation of cam arm 116. Thus, projection 117 produces a high "starting" torque on pawl 106 and provides maximum pawl movement during the final movement of the pawl. It will be appreciated that manual cam arm 118 will not move during an electrical release of the hook, and that the arms 118 and 122 move only during a manual hook release to the dotted line position of FIG. 8. By not actuating the manual release structure during an electrical release, the full power of the solenoid is available for releasing purposes.

It is to be understood that various modifications to the disclosed embodiment may be apparent to those skilled in the art without departing from the spirit and scope thereof, and it is intended that the invention be defined only by the scope of the following claims.

We claim:

1. A releasable hook apparatus comprising, in combination,
   (a) a hook support body adapted to be attached to supporting means,
   (b) a throated hook pivotally mounted on said support body pivotable between latched and unlatched positions,
   (c) a latch defined on said hook,
   (d) latch-locking means mounted on said support body adapted to selectively, lockingly cooperate with said latch,
   (e) release means associated with said locking means adapted to selectively release said locking means and said latch,
   (f) a load retainer pivotally mounted on said hook pivotal between load-receivable and load-retaining positions,
   (g) said load retainer including a first arm disposed within the throat of said hook when said retainer is in the load-receivable position and a second arm closing the hook throat when said retainer is pivoted to the load-retaining position, and
   (h) load-retainer locking means maintaining said retainer in the load-retaining position when said hook is in said latched position.

2. A releasable hook apparatus comprising, in combination,
   (a) a hook support body adapted to be attached to supporting means,
   (b) a throated hook pivotally mounted on said support body pivotable between latched and unlatched positions,
   (c) a latch defined on said hook,
   (d) latch-locking means mounted on said support body adapted to selectively, lockingly cooperate with said latch,
   (e) release means associated with said locking means adapted to selectively release said locking means and said latch,
   (f) a load retainer pivotally mounted on said hook pivotal between load-receivable and load-retaining positions,
   (g) said load retainer including an L-shaped element having first and second arms rigidly interconnected,
   (h) said first arm being disposed within the throat of said hook when said retainer is in the load-receivable position,
   (i) said second arm closing the hook throat when said retainer is pivoted to the load-retaining position, and
   (j) load-retainer locking means mounted on said support body engaging said second arm when said retainer is pivoted to the load-retaining position and said hook is in the latched position.

3. In a releasable hook apparatus, as in claim 2, wherein
   (a) actuating means are mounted on said support body operatively associated with said release means,
   (b) said hook including a load-bearing surface,
   (c) said first arm being disposed to a first position adjacent said hook load-bearing surface when said retainer is in the load-retaining position and adapted to be depressed to a second position upon a load of predetermined weight being imposed on said hook load-bearing surface,
   (d) spring means imposing a predetermined biasing force on said first arm tending to bias said first arm from said second position to said first position,
   (e) sensing means responsive to positioning of said first arm to said second position, and
   (f) means selectively, operatively connecting said sensing means to said actuating means whereby said actuating means may actuate said release means upon movement of said first arm from said second position to said first position.

4. A releasable hook apparatus comprising, in combination,
   (a) a hook support body adapted to be attached to supporting means,
   (b) a hook pivotally mounted on said support body pivotal between latched and unlatched positions,
   (c) a latch defined on said hook,
   (d) latch-locking means including a pawl pivotally mounted on said support body adapted to selectively, lockingly engage said latch,
   (e) release means associated with said locking means adapted to selectively release said locking means and said latch,
   (f) a safety lock spaced from said hook and mounted on said support body selectively positionable between operative and inoperative positions,
   (g) said safety lock including an abutment shoulder engaging said pawl and preventing pivoting thereof when said safety lock is in the operative position thereby preventing release of said latch-locking means, and
   (h) manually operable mechanical actuating means associated with said safety lock for releasing said safety lock from its operative position.

5. In a releasable hook apparatus, as in claim 4, wherein
   (a) sensing means are mounted on said support body sensing the position of said safety lock, and
   (b) indicating means associated with said sensing means indicating the operative and inoperative positions of said safety lock.

6. A releasable hook apparatus comprising, in combination,
   (a) a hook support body adapted to be attached to supporting means,
   (b) a hook pivotally mounted on said support body pivotal between latched and unlatched positions,
   (c) a latch defined on said hook,
   (d) latch-locking means mounted on said support body adapted to selectively, lockingly cooperate with said latch,
   (e) release means associated with said locking means adapted to selectively release said locking means and said latch,
   (f) a safety lock mounted on said support body selectively positionable between operative and inoperative positions,
   (g) said safety lock including means adapted to engage said latch-locking means when said safety lock is in the operative position preventing release of said latch-locking means,
   (h) load-engaging means defined on said hook positionable between first and second positions in dependence on the load imposed on said hook while in the latched position,
   (i) spring means biasing said load-engaging means with a predetermined force from said second position to said first position upon the load imposed on said hook decreasing to a predetermined value,
   (j) first sensing means mounted on said support body sensing positioning of said hook in said latched position,
   (k) second sensing means mounted on said support body sensing the position of said safety lock lever,
   (l) third sensing means mounted on said support body sensing the position of said load-engaging means,
   (m) indicating means associated with said first and second sensing means, (n) said third sensing means being adapted to selectively actuate said release means upon said load-engaging means being biased from said second position to said first positoin due to a predetermined decrease in the load imposed on said hook.

7. In a releasable hook apparatus, as in claim 6, wherein
(a) said release means includes a solenoid, and
(b) said third sensing means comprises an electric switch adapted to selectively energize said solenoid.

8. In a releasable hook, as in claim 6, wherein
(a) said first sensing means includes an electric switch de-energizing said solenoid upon pivoting of said hook to the unlatched position.

9. In a releaseable hook apparatus comprising, in combination,
(a) a hook support body adapted to be attached to supporting means,
(b) a hook pivotally mounted on said support body pivotable between latched and unlatched positions,
(c) a latch defined on said hook,
(d) a latch plate affixed to said support body,
(e) a latch pawl pivotally mounted on said support body adapted to selectively engage said latch when said hook is in the latched position and maintain a locking interconnection between said latch and latchplate,
(f) an electrical solenoid mounted on said support plate,
(g) a rotatable cam arm mounted on said solenoid,
(h) a radially, elongated projection defined on said cam arm engaging said latch pawl wherein said projection engages said pawl at a first location when said pawl is engaging said latch and engages said pawl at a second position when said pawl is pivoted out of engagement with said latch, said second location being a greater distance from the axis of rotation of said cam arm and pawl than said first position, and
(i) switch means adapted to selectively energize said solenoid.

10. A releasable hook apparatus comprising, in combination,
(a) a hook support boy adapted to be attached to supporting means,
(b) a hook pivotally mounted on said support body pivotable between latched and unlatched positions,
(c) a latch defined on said hook,
(d) latch-locking means mounted on said support body adapted to selectively, lockingly cooperate with said latch,
(e) release means associated with said locking means adapted to selectively release said locking means and said latch,
(f) first sensing means mounted on said support body sensing positioning of said hook in said latched position,
(g) second sensing means including a load retainer pivotally mounted on said hook pivotal between load-receivable and load-retaining positions, sensing the presence of a predetermined minimum load on said hook,
(h) indicating means associated with said first sensing means indicating the latched and unlatched positions of said hook,
(i) actuating means adapted to actuate said release means,
(j) means selectively interconnecting said second sensing means to said actuation means whereby said second sensing means may actuate said actuating means,
(k) a throat defined on said hook,
(l) said load retainer including a first arm disposed within said throat when said retainer is in the load-receivable position and a second arm closing said throat when said retainer is pivoted to the load-retaining position, and
(m) load-retainer locking means defined on said support body engaging and locking said retainer in the load-retaining position when said hook is in the latched position and disengaging from said load retainer upon said hook pivoting to the unlatched position.

References Cited by the Examiner
UNITED STATES PATENTS

| | | | |
|---|---|---|---|
| 2,904,369 | 9/1959 | Campbell. | |
| 2,965,409 | 12/1960 | Elsner | 294—83.1 |
| 3,016,257 | 1/1962 | White | 294—83 |
| 3,032,365 | 5/1962 | Campbell | 294—83 |
| 3,061,355 | 10/1962 | Cozzoli | 294—83 |
| 3,068,034 | 12/1962 | Campbell | 294—83.1 |

HUGO O. SCHULZ, *Primary Examiner.*
ERNEST A. FALLER, SAMUEL F. COLEMAN,
*Examiners.*